US010140672B2

(12) United States Patent
Hohlfeld et al.

(10) Patent No.: US 10,140,672 B2
(45) Date of Patent: *Nov. 27, 2018

(54) APPARATUS AND METHOD OF MANAGING A LICENSABLE ITEM

(71) Applicant: QUALCOMM Incorporated, San Diego, CA (US)

(72) Inventors: Matthew W. Hohlfeld, San Diego, CA (US); Michael P. Mahan, San Diego, CA (US); Giridhar D. Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/834,913

(22) Filed: Aug. 25, 2015

(65) Prior Publication Data

US 2015/0363901 A1    Dec. 17, 2015

Related U.S. Application Data

(63) Continuation of application No. 13/118,684, filed on May 31, 2011, now Pat. No. 9,152,771.

(51) Int. Cl.
*G06Q 50/18* (2012.01)
*G06Q 10/00* (2012.01)
(Continued)

(52) U.S. Cl.
CPC ......... *G06Q 50/184* (2013.01); *G06F 21/105* (2013.01); *G06Q 10/00* (2013.01);
(Continued)

(58) Field of Classification Search
CPC .... G06Q 50/184; G06Q 10/00; G06Q 10/101; G06Q 30/06; G06Q 2220/18; G06R 21/105; G06F 2221/0793; G06F 21/105
(Continued)

(56) References Cited

U.S. PATENT DOCUMENTS 5,553,143 A * 9/1996 Ross ....................... G06F 21/10
705/56
6,028,838 A    2/2000 Yamamura et al.
(Continued)

FOREIGN PATENT DOCUMENTS

CN         100454207 C    1/2009
EP         2003586 A2     12/2008
(Continued)

OTHER PUBLICATIONS

International Search Report and Written Opinion—PCT/US2012/039680—ISA/EPO—dated Sep. 7, 2012.
Taiwan Search Report—TW101119615—TIPO—dated Jul. 3, 2014.

*Primary Examiner* — Abu S Sholeman
(74) *Attorney, Agent, or Firm* — MG-IP Law, P.C.

(57) ABSTRACT

An apparatus and method of managing a licensable item includes accessing a licensing policy related to managing a licensable item, and a license agent making a determination to act to enforce the licensing policy or to first communicate with a server before acting to enforce the licensing policy. Further, the apparatus and method include enforcing the licensing policy in accordance with the determination to act to enforce the licensing policy or to first communicate with a server before acting.

40 Claims, 12 Drawing Sheets

(51) Int. Cl.
  *G06F 21/10* (2013.01)
  *G06Q 30/06* (2012.01)
  *G06Q 10/10* (2012.01)

(52) U.S. Cl.
  CPC .......... *G06Q 10/101* (2013.01); *G06Q 30/06* (2013.01); *G06F 2221/0793* (2013.01); *G06Q 2220/18* (2013.01)

(58) Field of Classification Search
  USPC .................................................. 726/1
  See application file for complete search history.

(56) References Cited

U.S. PATENT DOCUMENTS

| | | | |
|---|---|---|---|
| 6,253,258 B1 | 6/2001 | Cohen | |
| 8,396,650 B2 | 3/2013 | Kwong et al. | |
| 8,448,009 B2 | 5/2013 | Yairi et al. | |
| 8,544,105 B2 | 9/2013 | McLean et al. | |
| 8,607,295 B2 | 12/2013 | Bhatia et al. | |
| 8,611,544 B1* | 12/2013 | Herbach | H04L 63/08 380/279 |
| 9,152,771 B2 | 10/2015 | Hohlfeld et al. | |
| 2001/0011253 A1 | 8/2001 | Coley et al. | |
| 2002/0019814 A1* | 2/2002 | Ganesan | G06F 21/10 705/59 |
| 2003/0078853 A1 | 4/2003 | Peinado et al. | |
| 2003/0084306 A1 | 5/2003 | Abburi et al. | |
| 2003/0195851 A1 | 10/2003 | Ong | |
| 2003/0232616 A1* | 12/2003 | Gidron | G06Q 30/04 455/406 |
| 2003/0236820 A1* | 12/2003 | Tierney | G06F 21/10 709/203 |
| 2004/0071279 A1 | 4/2004 | Herrmann et al. | |
| 2004/0117483 A1* | 6/2004 | Singer | G06F 21/10 709/225 |
| 2005/0021995 A1* | 1/2005 | Lal | G06Q 20/123 726/4 |
| 2005/0119977 A1 | 6/2005 | Raciborski | |
| 2005/0138082 A1* | 6/2005 | Rauma | H04L 67/1095 |
| 2005/0144141 A1* | 6/2005 | Nagao | G06F 21/10 705/59 |
| 2006/0031222 A1 | 2/2006 | Hannsmann et al. | |
| 2006/0253400 A1 | 11/2006 | Okamoto et al. | |
| 2007/0233609 A1 | 10/2007 | Bovee et al. | |
| 2007/0294773 A1 | 12/2007 | Hydrie et al. | |
| 2008/0098212 A1* | 4/2008 | Helms | H04L 63/0428 713/155 |
| 2008/0162170 A1* | 7/2008 | Kumar | G06F 21/10 705/59 |
| 2008/0195871 A1 | 8/2008 | Peinado et al. | |
| 2008/0209393 A1* | 8/2008 | Evensen | G06F 9/44521 717/108 |
| 2008/0216148 A1 | 9/2008 | Bienek et al. | |
| 2008/0256645 A1 | 10/2008 | Choi et al. | |
| 2008/0320551 A1* | 12/2008 | Grigorovitch | G06F 21/10 726/1 |
| 2009/0058822 A1 | 3/2009 | Chaudhri | |
| 2009/0165083 A1* | 6/2009 | McLean | G06F 21/10 726/1 |
| 2009/0300712 A1 | 12/2009 | Kaufmann et al. | |
| 2009/0307361 A1 | 12/2009 | Issa et al. | |
| 2010/0049989 A1 | 2/2010 | Lee | |
| 2010/0199105 A1 | 8/2010 | Lee | |
| 2010/0306485 A1* | 12/2010 | Dubhashi | G06F 21/10 711/162 |
| 2010/0325735 A1 | 12/2010 | Etchegoyen | |
| 2011/0035812 A1 | 2/2011 | Strohwig et al. | |
| 2011/0126005 A1 | 5/2011 | Carpenter et al. | |
| 2011/0167499 A1* | 7/2011 | Strom | G06F 21/121 726/27 |
| 2011/0191859 A1* | 8/2011 | Naslund | G06F 21/10 726/27 |
| 2011/0197260 A1* | 8/2011 | Maes | G06F 21/554 726/3 |
| 2011/0202751 A1* | 8/2011 | Kim | G06F 21/125 713/2 |
| 2011/0218928 A1 | 9/2011 | Refior et al. | |
| 2011/0227857 A1 | 9/2011 | Chaudhri | |
| 2011/0258706 A1* | 10/2011 | Rouse | H04N 21/4516 726/28 |
| 2011/0302574 A1* | 12/2011 | Yoshikawa | G06F 8/65 717/173 |
| 2012/0054826 A1* | 3/2012 | Asim | G06F 21/6245 726/1 |
| 2012/0054874 A1 | 3/2012 | Chaudhri | |
| 2012/0079607 A1* | 3/2012 | Lal | G06F 21/10 726/29 |
| 2012/0284370 A1 | 11/2012 | Hierro | |
| 2012/0303778 A1 | 11/2012 | Ahiska et al. | |
| 2012/0311655 A1* | 12/2012 | Hohlfeld | G06F 21/105 726/1 |
| 2012/0311724 A1* | 12/2012 | Mahan | G06F 21/629 726/29 |
| 2013/0167248 A1* | 6/2013 | Kwon | H04L 63/10 726/27 |
| 2013/0305383 A1* | 11/2013 | Garralda | G06Q 30/00 726/26 |
| 2016/0267257 A1* | 9/2016 | Wisgo | G06F 21/105 |

FOREIGN PATENT DOCUMENTS

| | | |
|---|---|---|
| GB | 2439573 A | 1/2008 |
| JP | H10135962 A | 5/1998 |
| JP | 2006031211 A | 2/2006 |
| JP | 2008242856 A | 10/2008 |
| JP | 2009020872 A | 1/2009 |
| JP | 2010522382 A | 7/2010 |
| WO | 09082756 | 7/2009 |

* cited by examiner

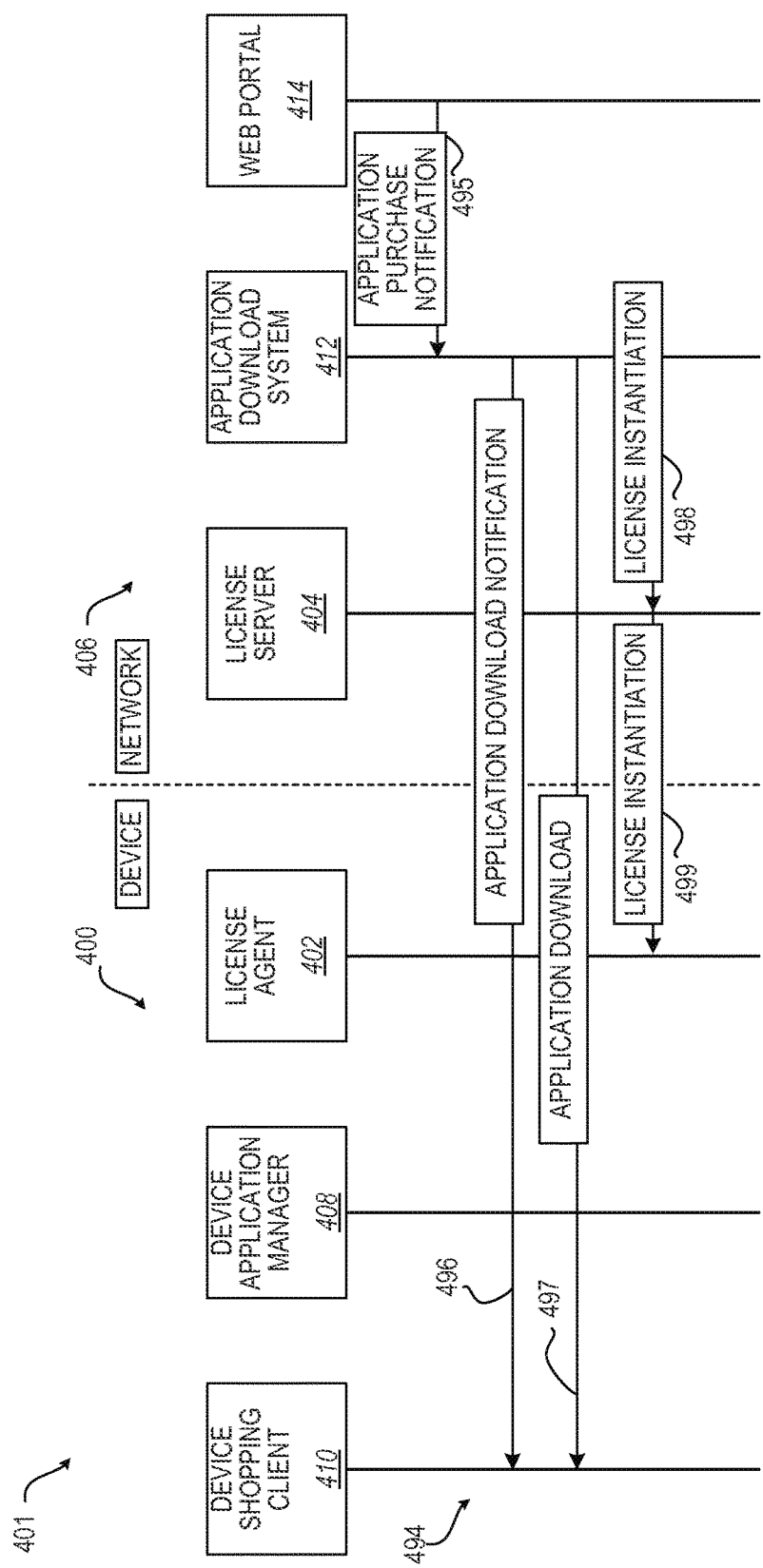

APPARATUS AND METHOD OF MANAGING A LICENSABLE ITEM

CLAIM OF PRIORITY 35 U.S.C. § 119

The present application for patent is a Continuation of Non-Provisional application Ser. No. 13/118,684, entitled "APPARATUS AND METHOD OF MANAGING A LICENSABLE ITEM", filed May 31, 2011, which is hereby expressly incorporated by reference herein in its entirety.

BACKGROUND

The present disclosure relates to a communication environment, and more particularly, to providing improved apparatus and methods of managing licensed items, such as content and/or a service, on a communication device.

Although the described aspects relate generally to communication devices, an example use case with mobile devices illustrates problems with current licensing models. Mobile operators or mobile device carriers play a major part in the telecommunication industry today. Initially, such mobile operators concentrated their efforts on generating revenue by increasing their subscriber base. However, it will be appreciated that in several countries, the scope for increasing the subscriber base has now become very limited, as the market has reached close to saturation point. As a result, the mobile operators have been branching into providing value added services to subscribers, in order to increase their revenue.

One means of generating increased revenue is through the sales of premium content and/or services to users, such as ringtones, wallpaper, games, etc. These items may be provided by the mobile operators themselves, or by business entities who may operate in collaboration with the mobile operators to provide such items. In some aspects, for example, these content and/or service items may be available for download to a user's communication device, such as a mobile device, upon payment of a fee.

Many benefits such as maximizing the potential earnings for sales may accrue upon recommending and distributing to users content and/or services that are of interest to the users. The user can have a better experience using the user's communication device in light of these content and/or services. Licensing of such content and/or services can provide an incentive for providers to create such offerings.

Providers of content and/or services can make particular types of such items subject to differing licensing terms, such as a period of use, number of uses, ability of an end user to transfer the item, etc., which present a complex management problem for licensing to communication devices or mobile devices. In particular, changes (e.g., download/installation, recall, upgrade, update, transfer, usage monitoring, deletion, etc.) related to a licensed item create difficulties for managing licenses at the device and/or at a network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method of managing a licensable item by accessing a licensing policy related to managing a licensable item, making a determination, by a license agent, to act to enforce the licensing policy or to first communicate a the server before acting to enforce the licensing policy, and enforcing the licensing policy in accordance with the determination.

In another aspect, the present disclosure provides at least one processor for managing a licensable item. A first module accesses a licensing policy related to managing a licensable item. A second module makes a determination, by a license agent, to act to enforce the licensing policy or to first communicate with a server before acting to enforce the licensing policy. A third module enforces the licensing policy in accordance with the determination.

In an additional aspect, the present disclosure provides a computer program product for managing a licensable item. A non-transitory computer-readable storage medium stores instructions. At least one instruction causes a computer to access a licensing policy related to managing a licensable item. At least one instruction causes the computer to make a determination, by a license agent, to act to enforce the licensing policy or to first communicate with a server before acting to enforce the licensing policy. At least one instruction causes the computer to enforce the licensing policy in accordance with the determination.

In a further aspect, the present disclosure provides an apparatus for managing a licensable item. The apparatus comprises means for accessing a licensing policy related to managing a licensable item. The apparatus comprises means for making a determination, by a license agent, to act to enforce the licensing policy or to first communicate with a server before acting to enforce the licensing policy. The apparatus further comprises means for enforcing the licensing policy in accordance with the determination.

In yet another aspect, the present disclosure provides an apparatus for managing a licensable item. A network interface communicates with a server. A license agent accesses a licensing policy related to managing a licensable item, making a determination to act to enforce the licensing policy or to first communicate with the server via the network interface before acting to enforce the licensing policy, and enforcing the licensing policy in accordance with the determination.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4F illustrates a timing diagram for an alternate scenario for the license agent managing licenses when a licensed item, such as an application, is purchased, deleted or licensed via a web-originated event, according to one aspect.

DETAILED DESCRIPTION

Figure 1:
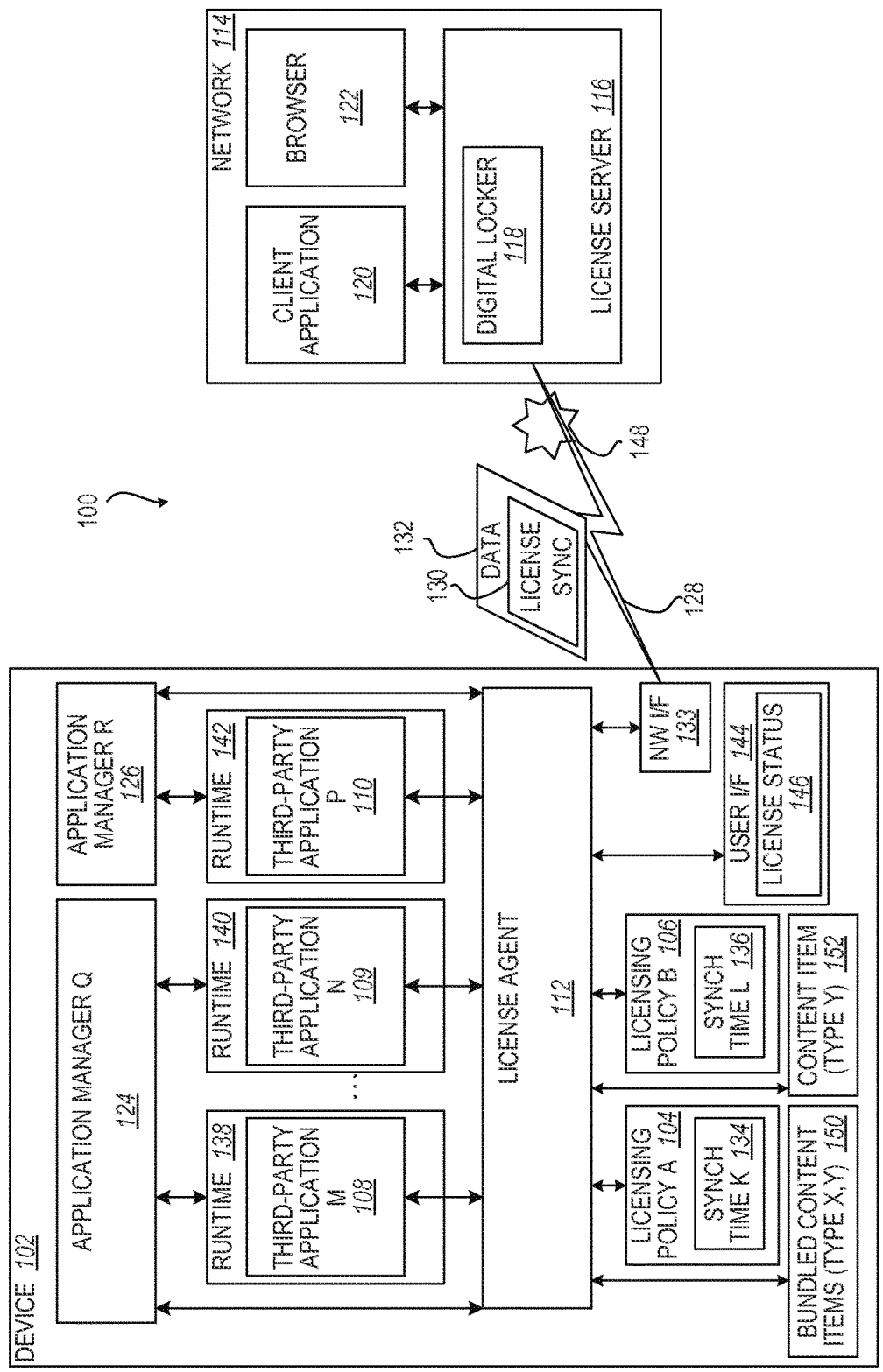
FIG. 1 illustrates a schematic diagram of an apparatus for managing a licensable item, such as content and/or a service, in a communications environment.

This disclosure is concerned with managing and optimizing licenses corresponding to a licensable item, such as content and/or a service, on a device such as a networked device, or a communication device, or a mobile device. A client side license agent is provided to enforce license policies for licensable items. The client side license agent is configured to determine whether it can act alone to enforce a licensing policy, or whether it needs to communicate with a server. In the event communication with the server is necessary, the license agent is configured to optimize communication with the server to reduce network traffic. For example, communications with the server regarding licenses can be multiplexed and transmitted along with other data to reduce network traffic. The license agent may be configured to enforce licensing policies set by the owner of the licensable item, such as the number of times/time limit for accessing the item, whether the item can be upgraded or updated, whether the item can be stored on multiple devices, etc.

As used in this disclosure, the term "content" includes, at least, any type of application, multimedia file, image file, executable, program, web page, script, document, presentation, message, data, meta-data, or any other type of media or information that may be rendered, processed, or executed on a device. Also, the term "service" includes, at least, providing of an action or an accommodation, including in electronic or non-electronic form. For example, in one aspect, a service may include providing access, such as access to a network server, access to a physical location such as a building, a restricted area, etc. For instance, in one aspect that should not be construed as limiting, a use case of providing access to a network server may include a scenario where a user is a player in a game, and access is provided to a network server to enable the user to participate in a network-based multi-player service for the game provided by the network server. Additionally, for instance, in an aspect that should not be construed as limiting, a use case of providing access to a physical location may include providing access and/or a membership to a gym.

As used in this disclosure, the term "licensable item" or "licensed item" refers to content, or to a service, or to both, including items that can be used, executed, distributed, accessed, modified, viewed, presented, etc., subject to a license.

As used in this disclosure, the term "license" is used to describe an enabling key, datum, object, or authenticated message that allows use of a licensable item. The license can be a specific implementation of Data Rights Management (DRM) executed by the license agent on the device with at least intermittent coordination with the server. DRM, and thus the term license as used herein, can refer to access control technologies that are used by hardware manufacturers, publishers, copyright holders and individuals to limit the use of digital content such as licensable content as well as devices. The license can be used to describe any technology that inhibits uses of licensable content in a manner that is not desired or intended by an originating or distributing content provider. Moreover, a license may include one or more policies or policy objects, which may correspondingly define one or more rules, conditions, parameters, or instructions that characterize the license.

It should be appreciated that with the benefit of the present disclosure, a license agent can consist of a single component. Alternatively or in addition, a license agent can consist of a plurality of components acting in concert.

Alternatively or in addition, optimizations can be provided for improved accuracy while devices are off-line or otherwise out of network communication. In addition, optimizations can improve accuracy in reporting available licenses to end users as well as reducing delays visible to the user by performing pre-fetching.

In an exemplary aspect, the present disclosure provides for optimized management of multiple licenses with potentially expressed differentiated license policies within a license agent.

In one aspect, the license agent can address "run-ability" or "play-ability" of licensed items. Thereby, a license agent of the communication device is responsible for enabling all licensed items to be consumed (e.g., run, played, presented, executed, etc.) by the communication device as expressed in one or more policy objects. If one or more licensable items are licensed as a bundle, the license agent can apply execution constraints across the bundle consistent with one or more expressed policies.

In another aspect, the license agent can address "upgrade-ability" of licensed items. Thereby, a license agent of the communication device is responsible for managing upgrades of licensed items on the communication device as expressed in one or more policy objects. Policies can differentiate whether the licensed item has rights or access to upgrades and constraints regarding the upgrade domain (e.g., upgrade allowed for all future versions, upgrades allowed up to version X, free upgrades allowed, upgrades discounted, etc.). If one or more licensable items are licensed as a bundle, the license agent can apply upgrade constraints across the bundle consistent with one or more expressed policies.

In an additional aspect, the license agent can address "update-ability" of licensed items. Thereby, the license agent of the communication device manages updating of all licensed items on the communication device as expressed in one or more policy objects. Policies can differentiate whether the licensed item has rights to alone or more bug fix versions (e.g., patches), critical bug fix versions, limited new features, etc. If one or more licensable items are licensed as a bundle, the license agent can apply update constraints across the bundle consistent with one or more expressed policies.

In a further aspect, the license agent can address "recall-ability" of licensed items. Thereby, the license agent manages any recalls for licensed items ("recalled items") on a communication device as expressed in one or more policy objects. Policies can differentiate whether the licensed item is to be recalled reliably (e.g., physically irretrievable), to be rendered unplayable while still present on the communication device, or to be scheduled for removal subsequent to being rendered unplayable. Policy can specify requirements for signaling to a license server that the licensed item has been removed. Policy can specify how to handle situations in which the recalled licensed item is currently loaded and running, such as by signaling to the platform to disable the current execution of the recalled licensed item. If a recalled licensed item is licensed as a bundle or a part of the bundle, then the license agent can apply recall behavior across the bundle or upon an individual licensed item in a manner consistent with one or more expressed policies.

In yet another aspect, the license agent can manage entitlement grants for download, installation, and execution of the licensed items. For instance, an entitlement grant can allow execution access to a streamed licensed item hosted on a separate server. For a downloaded licensed item, the device license agent can manage the installation policy of a distribution system such as the maximum number of installed copies, maximum number of devices that can install the licensed item, and any deadlines to install and execute the licensed item in a particular environment. If one or more licensed items are licensed as a bundle, the license agent can apply download, installation, and execution constraints across the either bundle set or on individual licensed items in a manner that is consistent with one or more expressed policies.

In yet an additional aspect, the license agent can facilitate subscriptions, purchases, or rebates associated with the afore-mentioned changes in licensed items and bundles of licensed items. License policy can enable flexible bundling rules such as swapping of licensed items as well as adding or removing of licensed items at a discount or a rebate.

In fulfilling one or more of the functions as listed above, the license agent on the communication device can optimize communications with a centralized license manager that serves a population of communication devices such as mobile devices.

In one aspect, the license agent can perform license synchronization ("sync") data transfer in certain conditions selected to optimize network data traffic. For instance, sync data transfer can occur upon shopping client startup, device reboot, or upon expiration of a license sync event timer.

In another aspect, the license agent can bundle synchronization events with other data or control message traffic to optimize data transmission. Thereby, a benefit can be realized including a lower number of connection setups and tear downs. Additionally, license synchronization data transmission can be optimized by compressing bundled data so that data transmission size is lower.

Furthermore, it is contemplated that license synchronization as generally understood can overload other data traffic that a distribution system manages and controls. In one aspect, the present disclosure provides that license sync data can be multiplexed with other distribution data traffic such as licensable item store browsing and licensable item download signaling. Thereby, the overhead for license synchronization can be significantly reduced.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects. In one or more of the following descriptions corresponding to FIGS. 1, 4A-4F, 6 and 7, the described aspects may be explained with examples using the terms "application" or "content," however, these teachings may apply to any licensable item. Moreover, one or more of the following examples may be described with reference to a mobile device, however, these teaching apply to any type of communication device.

With initial reference to FIG. 1, in a communication system 100, an apparatus or a device 102 manages and enforces licensing policies 104, 106 for licensable items (e.g., media content, applications, services, etc.) which may include or which may be used, consumed, played, executed, etc., by third party applications 108-110 in a communication environment. In an aspect, a license manager or license agent 112 is provided for enforcing the licensing policies 104, 106 at the device 102 for use on the device 102. According to one example, a single license manager or license agent 112 can be provided to enforce the licensing policies 104, 106 at the device 102 for use on the device 102. Further, according to an example, the single license manager or license agent 112 may be configured to operate with different types of content, different types of services, content or services from different licensing authorities or systems, etc. In other words, in this aspect, license manager or license agent 112 may function as a universal or generic license manager or license agent, thereby eliminating or reducing the need for a plurality of different license managers or agents specific to different types of content or services, different licensing authorities, or different licensing systems.

A network 114 maintains a license server or server 116 for tracking the licensing policies 104, 106 maintained by the device 102. For example, the server 116 can comprise a digital locker 118 for securely maintaining licenses. The content that is subject to a licensing policy 104, 106 can be affected by other network entities, depicted as a client application 120 and a network portal or browser 122. Changes can also occur on the device 102 that affect content that is licensed, such as deletions of content made by application managers 124, 126. Changes to licensing policies 104, 106 maintained by the device 102 that originate at either the device 102 or the network 114 are communicated between the license agent 112 and the server 116 across a communication link 128 as license synchronization data 130, which can be included with other data traffic 132 not associated with licensing policies 104, 106 in order to reduce network traffic. A network interface 133 of the device 102 can communicate on an uplink, a downlink, or both. The communication link 128 can comprise at least one of or a combination of a cellular link, a wireless link or a wired link.

The synchronization can entail updating a synchronization time 134, 136 respectively for licensing policies 104, 106. The license agent 112 can enforce licensing policy for different types of content and for different runtimes. To illustrate these aspects, in one example, runtime environments or runtimes 138, 140 for running respective third-party applications 108, 109 are managed by application manager 124. According to one aspect, a runtime 142 runs the third-party application 110 managed by application manager 126.

In one aspect, the apparatus or device 102 has a user interface 144 for accurately reporting a license status 146 for licensing policies 104, 106, such as by synchronous synchronization or by referencing the synchronization time 134, 136. For example, for minimizing network overhead or due to an unavailable channel as depicted at 148, the license agent 112 can determine whether it can operate autonomously for at least a period of time.

The license agent 112 can enforce licensing policies 104, 106 for a plurality of content item 150, 152. In one aspect, content item 150 is a bundle of content items of mixed content types.

Thus, in one aspect, the apparatus or device 102 is provided for licensing in a mobile communication environment. The network interface 133 receives a licensing policy related to managing any one of a plurality of different types of content items 150, 152. The license agent 112 determines whether it can act on its own or whether it should first communicate with the server 116 in order to enforce one of the licensing policy 104, 106. The license agent 112 enforces the licensing policy in accordance with the determining. In another aspect, the license agent 112 is further for determining to communicate with the server 116 by synchronizing the licensing policy 104, 106. For example, synchronizing can result in adding or modifying a reporting feature for the licensing policy 104, 106.

In one aspect, synchronizing can be performed intermittently. For instance, the licensing policy 104, 106 can incrementally be synchronized during more than one communication connection with the server 116. For another instance, synchronization of licensing policy 104, 106 can entail incorporating license synchronization data 130 associated with the licensing policy 104, 106 with data traffic 132 that is unrelated to the licensing policy so as to reduce network overhead.

In another aspect, the license agent 112 is further for intermittently synchronizing the licensing policy 104, 106 by prefetching information associated with the licensing policy 104, 106 prior to enforcing the licensing policy 104, 106.

In one aspect, the license agent 112 is further for synchronizing the licensing policy 104, 106 by deferring download of a new licensing policy in response to detecting a partial communication connection with the server.

In one aspect, the license agent 112 is further for synchronizing the licensing policy 104, 106 by communicating via at least one of or a combination of a cellular link, a wireless link, and a wired link.

In one aspect, the license agent 112 is further for determining that a communication connection with the server is not available in determining whether to enforce the licensing policy 104, 106.

In one aspect, the license agent 112 is further for determining whether the license agent can act on its own by determining that an elapsed time since synchronizing the licensing policy with the server has not exceeded a threshold. The license agent 112 is further for enforcing the licensing policy 104, 106 by indicating the license status 146 for the licensing policy 104, 106 to a user via the user interface 144 in accordance with the determining.

In one aspect, the license agent 112 performs the determining whether or not to enforce the license on its own by responding to a license transaction at a network portal or browser 122.

In one aspect, the license agent 112 is further for enforcing the licensing policy 104, 106 by a selected one of a recall, deletion, update, transfer, upgrade, expiration, download and activation of a selected content item 150, 152, any of which can be bundled content, different types of content (e.g., media, applications), or executed on different runtimes 138, 140 and 142.

In one aspect, enforcing the licensing policy 104, 106 can be achieved by monitoring duration of use of a selected one of the content items 150, 152. Alternatively or in addition, enforcing the licensing policy 104, 106 can be performed by monitoring an enumeration of launches of a selected one of the content items 150, 152.

Figure 2:
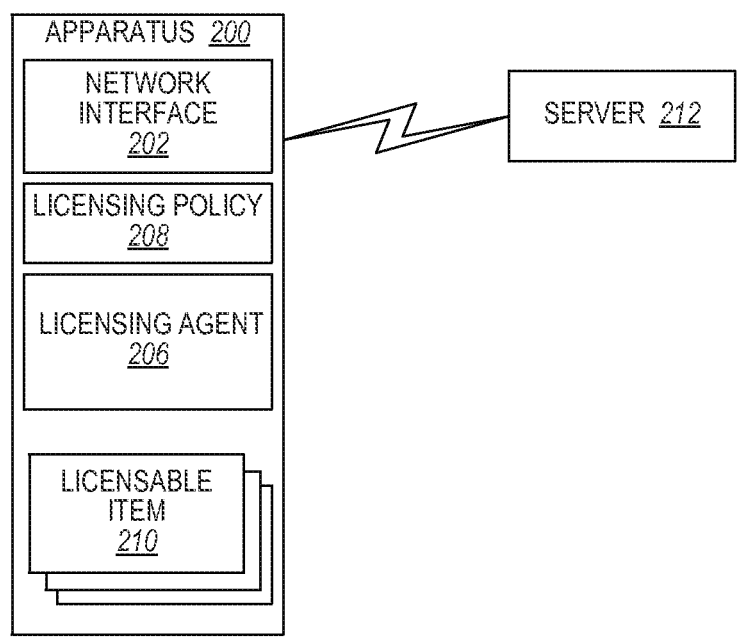
FIG. 2 illustrates a schematic diagram of communication system wherein a licensing agent on a communication device or mobile device intelligently and semi-autonomously enforces license policies for a licensed item, according to one aspect.

FIG. 2 provides an apparatus 200 for managing a licensable item, according to one aspect. A network interface 202 communicates with a server 204. A license agent 206 accesses a licensing policy 208 related to managing at least one licensable item 210, makes a determination to act to enforce the licensing policy 208 or to first communicate with the server 204 via the network interface 202 before acting to enforce the licensing policy 208, and enforces the licensing policy 208 in accordance with the determination.

Figure 3:
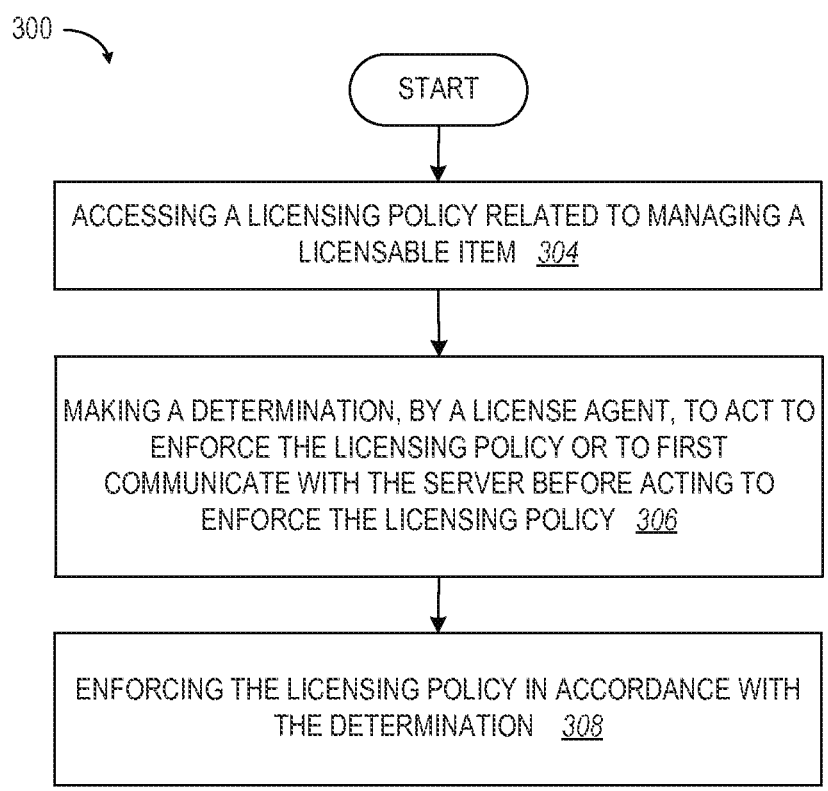
FIG. 3 illustrates a flow diagram for a method of managing a licensed item for a communication device or mobile device, according to one aspect.

In FIG. 3, the present disclosure provides a method 300 for managing a licensable item, according to one aspect. A device accesses a licensing policy related to managing a licensable item (block 306). The device makes a determination, by a license agent, to act to enforce the licensing policy or to first communicate with a server before acting to enforce the licensing policy (block 304). The device further enforces the licensing policy in accordance with the determination (block 308).

In one aspect, accessing the licensing policy further comprises accessing an enforcement rule associated with the licensing policy. Enforcing the licensing policy can include determining, by the license agent, a constraint imposed by the enforcement rule on an action taken with the licensable item.

In another aspect, determining, by the license agent, an action comprises a selected one of a recall, deletion, update, transfer, upgrade, expiration, download and activation of the licensable item.

In an additional aspect, making the determination further comprises accessing a synchronization rule that is associated with the licensing policy, and determining whether the synchronization rule calls for communicating with the server. For instance, making the determination can further comprise accessing a time stamp for a most recent synchronization of the licensing policy, and determining whether an elapsed time since the time stamp exceeds the synchronization rule. For another example, enforcing the licensing policy in accordance with the determination can further comprise synchronizing the licensing policy by downloading a new enforcement rule, and determining, by the license agent, a constraint imposed by the new enforcement rule on an action taken with the licensable item.

In a further aspect, enforcing the licensing policy in accordance with the determination further comprises reporting to the server, by the license agent, an action taken with the licensable item.

In yet another aspect, communicating with the server further comprises communicating packet data incorporating data associated with the licensing policy with data traffic that is unrelated to the licensing policy to reduce network overhead.

In yet an additional aspect, making the determination further comprises determining that the synchronization rule allows an action to be taken with the licensable item when a connection to the server is unavailable, and enabling an action to be taken with the licensable item in response to determining that the connection to the server is unavailable. In an exemplary aspect, determining that the connection to the server is unavailable further comprises determining that the connection to the server has a capacity less than a threshold value.

In yet a further aspect, accessing the licensing policy further comprises responding to a user selection of the licensable item. For example, making the determination further comprises accessing a synchronization rule that is associated with the licensing policy, and determining whether the synchronization rule calls for communicating with the server, e.g. to check for and obtain one or more updated licensing policies. Enforcing the licensing policy further includes delaying an action for the licensable item until the licensing policy is synchronized with the server.

In another aspect, accessing the licensing policy further includes pre-fetching the licensing policy prior to a user selection of the licensable item. For example, pre-fetching the licensing policy further comprises pre-fetching the licensing policy associated with more than one licensable item. For another example, pre-fetching the licensing policy further comprises pre-fetching more than one licensing policy associated respectively with more than one licensable item. For an additional example, pre-fetching the licensing policy further comprises pre-fetching more than one licensing policy incrementally over intermittent communication sessions with the server.

In an additional aspect, accessing the licensing policy further comprises accessing a first licensing policy related to a first licensable item in a first runtime and accessing a second licensing policy related to a second licensable item in a second runtime. Enforcing the licensing policy further comprises enforcing, by the license agent, the first licensing policy for the first licensable item executed in the first runtime and enforcing, by the license agent, of the second licensing policy for the second licensable item executed in the second runtime.

In a further aspect, accessing the licensing policy further comprises accessing a first licensing policy related to a first licensable item of a first service type and accessing a second licensing policy related to a second licensable item of a second service type. Enforcing the licensing policy further comprises enforcing, by the license agent, the first licensing policy for the first licensable item and enforcing, by the license agent, of the second licensing policy for the second licensable item.

In yet another aspect, enforcing the licensing policy further comprises monitoring duration of use or an enumeration of launches of the licensable item.

In FIGS. 4A-4E, the present disclosure provides that a communication device, such as a mobile device 400, that can employ a license agent 402 that achieves end-to-end application licensing by working efficiently as part of a communication system 401 with a license server 404 of a network 406. For example, the license server 404 can provide a server-side license store (e.g., a digital locker, a digital vault, etc.) for a population of mobile device subscribers. In some situations, the mobile device 400 can be provisioned with content, such as by manual installation or by an original equipment manufacturer. Alternatively, the network 406 can provide or coordinate with a content distribution system, depicted as an application download system 412.

For clarity, a mobile device 400 is depicted as including the license agent 402, a device content manager that is depicted as a device application manager 408, and a device shopping client 410. The device application manager 408 can function as a device content interface for detecting changes to licensed content that originate at the mobile device 400. Certain license related events can require interaction with other remote entities (e.g., purchasing functions, subscription services, content providers, etc.), depicted as a web portal 414. Further, a particular user can be entitled to share licensing across multiple devices wherein a license agent 402 on a mobile device 400 respectively can signal each other to collaboratively ensure that the licenses are managed. In addition, a mobile device 400 can utilize a license agent 402 that can manage licenses by working efficiently with more than one license server 404, such as representing different content providers or a mobile device 400 capable of communicating with more than one network 406.

Consistent with one or more aspects, the license agent 402 can intelligently serve the mobile device 400 by one or more of:
   a. reflecting digital locker contents and status;
   b. being capable of working at least for a period of time offline as well as working online;
   c. managing licenses on behalf of multiple content items (e.g., media content, applications, etc.);
   d. interacting with the device content manager (e.g., device application manager 408) for various content management events;
   e. interacting with other applications (e.g., device shopping client 410) that constitute licensed content or that consume, use, present, display, play, or execute licensed content; and
   f. unifying license management of runtimes for different device content items (e.g., media content, applications, etc.).

It should be appreciated that with the benefit of the present disclosure, the license agent 402 in some implementations can perform these functions on behalf of a distributed device or system, for example, a home network or Personal Access Network (PAN).

Communication between the mobile device 400 and the network 406 and between the depicted constituent elements can be provided in whole or in part by a selected form of digital communication such as by cellular, wired or wireless connection(s) or a combination thereof.

Figure 4A:
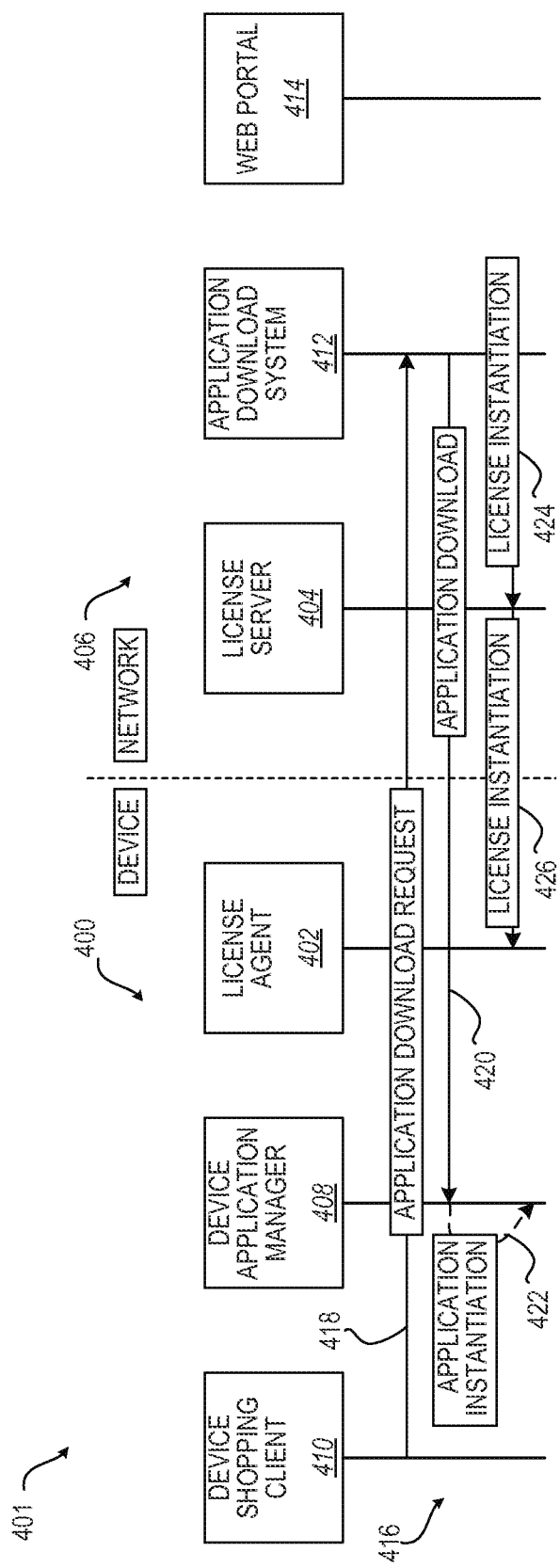
FIG. 4A illustrates a timing diagram for a scenario for a license agent managing licenses when a licensed item such as an application is instantiated on a communication device or mobile device, according to one aspect.

With particular reference to FIG. 4A, a scenario 416 is depicted wherein the license agent 402 manages licenses when a licensed item, such as an application, is instantiated on the communication device, such as mobile device 400, according to one aspect. The device shopping client 410 requests access to or download of licensable item(s), such as an application, from an application download system 412 as depicted at 418. The application download system 412 performs the application download to the device application manager 408 as depicted at 420, which in turn performs application instantiation as depicted at 422. The application download system 412 further initiates license instantiation with the license server 404 as depicted at 424, which in turn the license server 404 synchronizes with the license agent 402 as depicted at 426.

It should be appreciated with the benefit of the present disclosure that device-initiated application instantiation prompted through a device shopping client 410 is illustrative. The license agent 402 can further support other methods. The license policy is maintained in both the license server 404 as well as at the mobile device 400, such as with or accessible to the license agent 402. For instance, a purchase of license rights can create a license instantiation flow to the device with a separate request by the device for download of a licensable item, such as content.

Figure 4B:
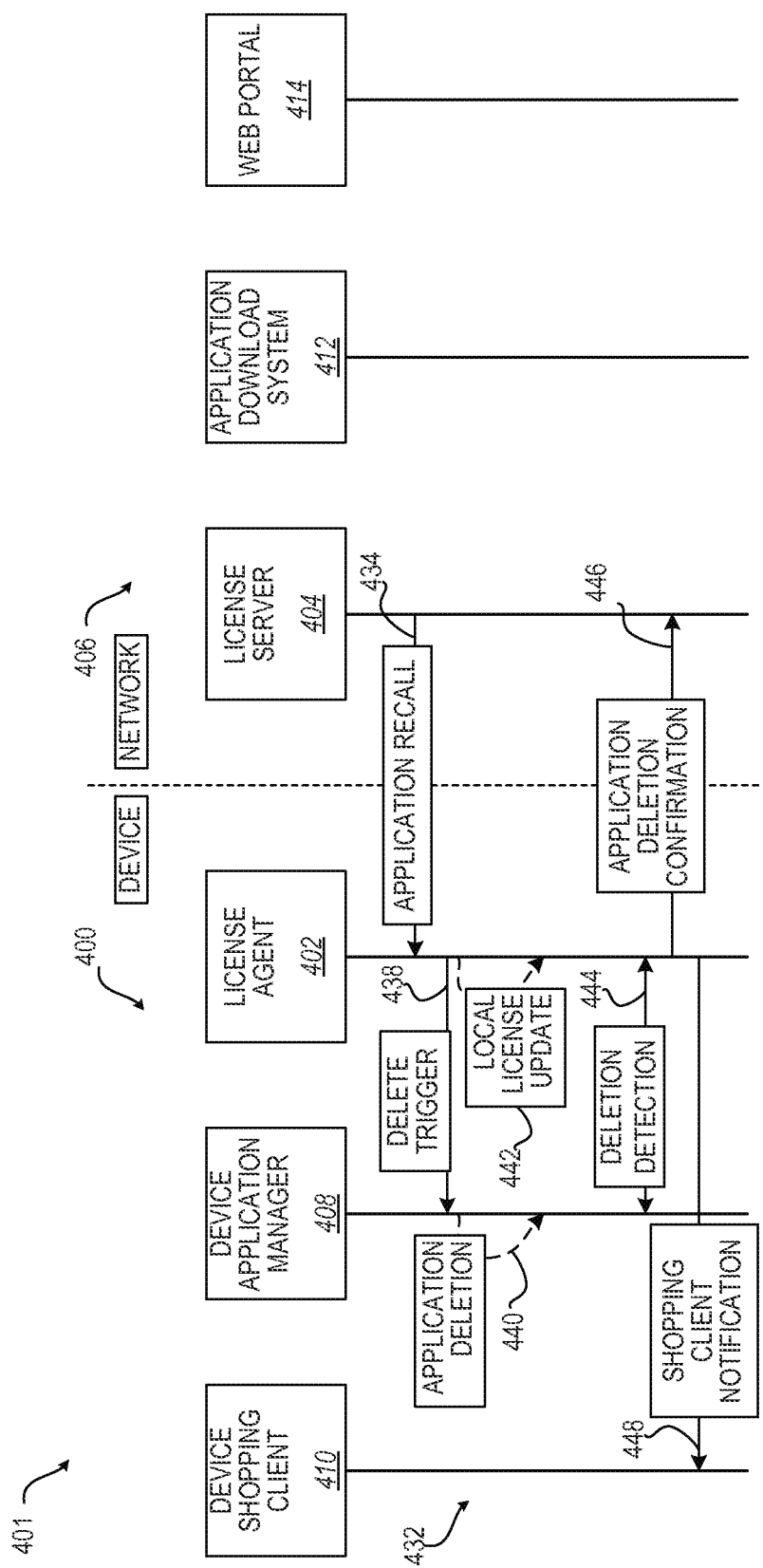
FIG. 4B illustrates a timing diagram for a scenario for the license agent managing licenses when a licensed item, such as an application, is recalled from the communication device or mobile device, according to one aspect.

With particular reference to FIG. 4B, a scenario 432 is depicted wherein the license agent 402 manages licenses when the licensed item, such as the application, is recalled from the communication device or mobile device 400, according to one aspect. The license server 404 triggers the application recall to the license agent 402 as depicted at 434. The license agent 402 can disable the application in some instances. For example, the license agent 402 can remove access to an unlocking key necessary to use the application. Such disabling can be useful in instances when deletion from Random Access Memory (RAM) or data storage can require a delay. The license agent 402 sends a trigger to delete the application to the device application manager 408 as depicted at 438. The device application manager 408 deletes the application as depicted at 440. The license agent 402 performs a local license update as depicted at 442. The device application manager 408 and license agent 402 interact as depicted at 444 to detect and confirm the deletion of the application. Then, the license agent 402 confirms to the license server 404 as depicted at 446 that the application has been deleted. The license agent 402 can also notify the device shopping client 410 as depicted at 448 that the application has been deleted.

Thus, in one example, the license agent 402 is responsible for deletion or marking of the license, triggering deletion of the application, confirming deletion of the application, notifying other applications about the recall, which in some instances results in providing an indication via a user interface to a user.

Figure 4C:
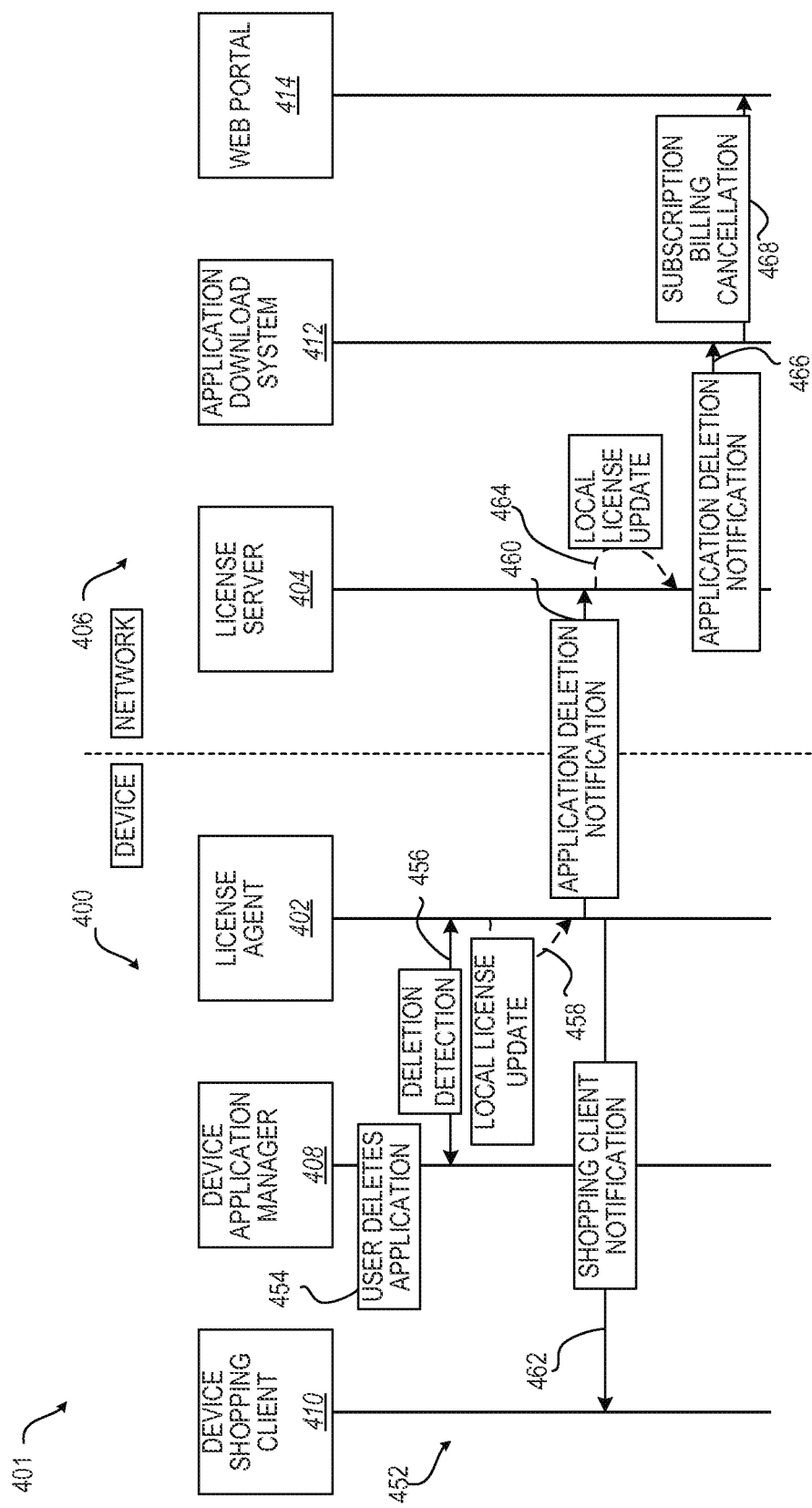
FIG. 4C illustrates a timing diagram for a scenario for the license agent managing licenses when a licensed item, such as an application, is deleted from the communication device or mobile device, according to one aspect.

With particular reference to FIG. 4C, a scenario 452 is depicted wherein the license agent 402 manages licenses when the deletion of the application is triggered at the communication device or mobile device 400, according to one aspect. In block 454, the user causes the device application manager 408 to delete an application. The device application manager 408 and license agent 402 interact as depicted at 456 to detect and confirm the deletion of the application. The license agent 402 performs a local license update as depicted at 458. The license agent 402 sends notification of application deletion as depicted at 460 to the license server 404. The license agent 402 can also notify the device shopping client 410 as depicted at 462 that the application has been deleted. The license server 404 performs a local license update as depicted at 464. The license server 404 sends notification of application deletion to the application download system 412 as depicted at 466. The application download system 412 sends subscription or billing cancellation in some instances as depicted at 468 to an appropriate network entity, depicted as the web portal 414.

Thus, the license agent 402 manages licenses by detecting deletion that can be a result of a push notification from the device application manager 408 or an indication from the device application manager 408 as a response to a polling message from the license agent 402.

Figure 4D:
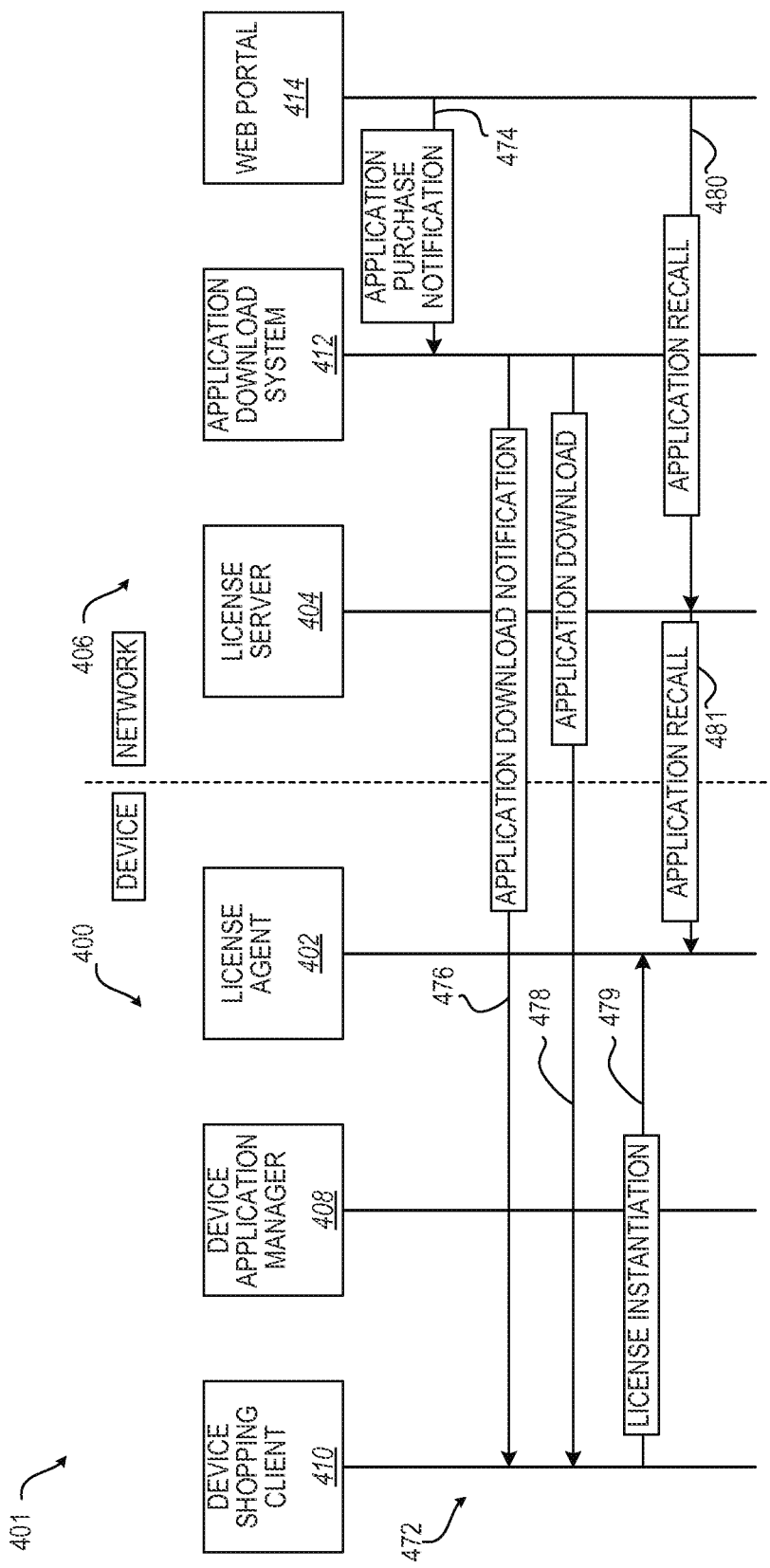
FIG. 4D illustrates a timing diagram for a scenario for the license agent managing licenses when a licensed item, such as an application, is purchased, deleted or licensed via a web-originated event, according to one aspect.

With particular reference to FIG. 4D, a scenario 472 is depicted wherein the license agent 402 manages licenses when the application is purchased, deleted or licensed via a web-originated event such as from a browser or desktop client, according to one aspect. In this instance, an application purchase is illustrated for the web-originated licensing event. In particular, the web portal 414 sends a notification of application purchase to the application download system 412 as depicted at 474. The application download system 412 sends a notification of application download as depicted at 476 to the device shopping client 410. The application download system 412 downloads the application as depicted at 478 to the device shipping client 410. The device shopping client 410 sends license instantiation to the license agent 402 as depicted at 479. Subsequently, the license agent 402 can synchronize with the license server 404. In the event of a recall, the web portal 414 can send an application recall to the license server 404 as depicted at 480, which in turn relays the application recall the license agent 402 as depicted at 481.

It should be appreciated with the benefit of the present disclosure that license synchronization and application download can be separate flows. Upon purchase, a synchronization event can let the device application manager 408 know that the device application manager 408 has rights to new content. In response, a user can choose to download and install the new content. In addition, rather than the device shopping client 410, the license agent 402 can instantiate the license.

Figure 4E:
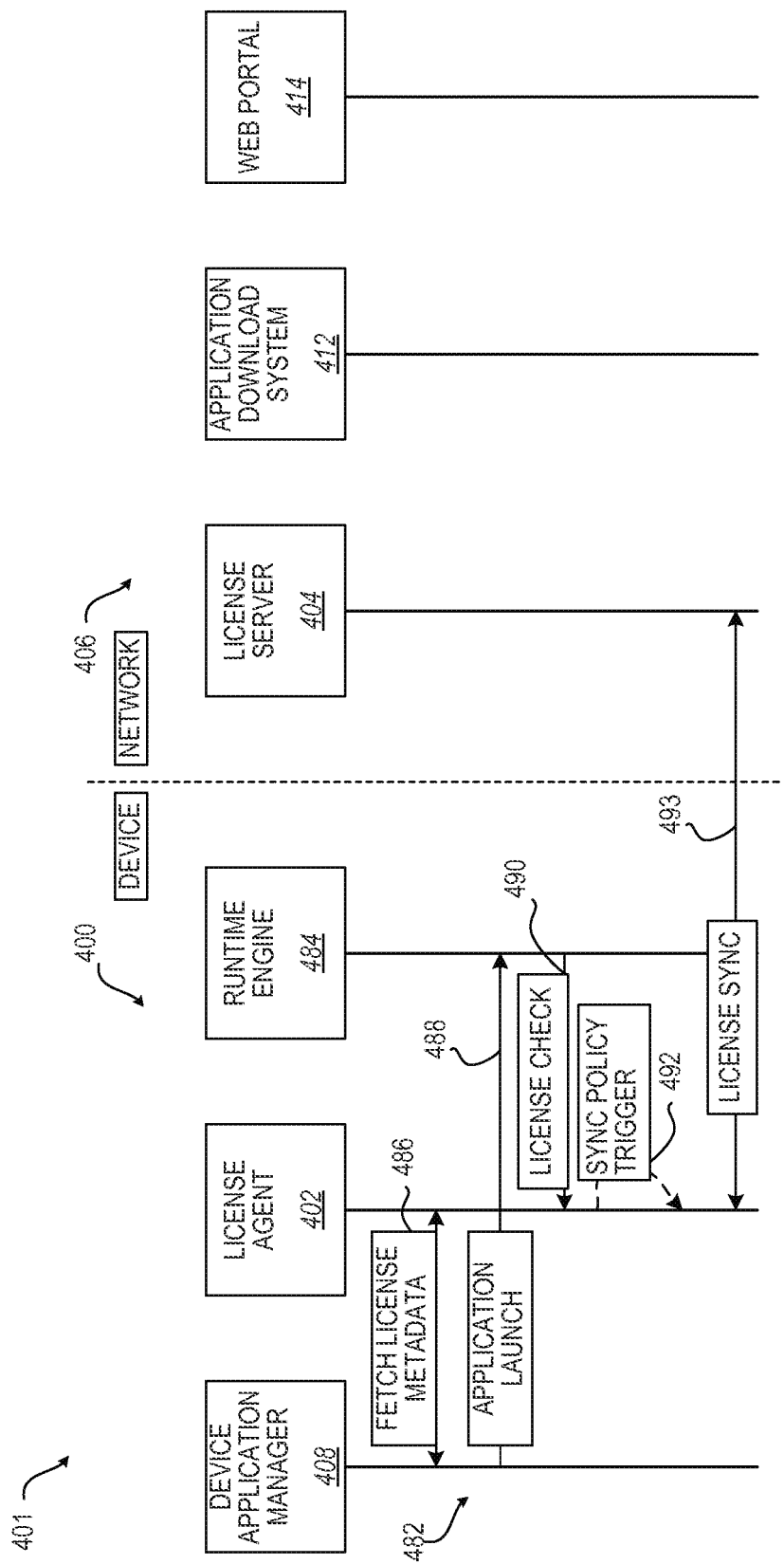
FIG. 4E illustrates a timing diagram for a scenario for the license agent managing licenses when managing a licensed item, such as an application, on the communication device or mobile device, including tracking enumeration or launches, according to one aspect.

With particular reference to FIG. 4E, a scenario 482 is depicted wherein the license agent 402 manages licenses on the communication device or mobile device 400 that require tracking enumeration or launches, according to one aspect. To that end, a runtime engine 484 that uses the licensed content such as the application can provide the data for license enforcement. The license agent 402 and the device application manager 408 communicate as depicted at 486 to fetch license metadata. As depicted at 488, the device application manager 408 launches an application by contacting the runtime engine 484. The runtime engine 484 performs a license check with the license agent 402 as depicted at 490, which in turn performs a sync policy trigger as depicted at 492 in order to monitor or enumerate usage of the application in accordance with the license policy. Thereafter, the license agent 402 and the license server 404 can perform license synchronization as depicted at 493.

With particular reference to FIG. 4F, a scenario 494 is depicted wherein the license agent 402 manages licenses when the application is purchased, deleted or licensed via a web-originated event such as from a browser or desktop client, according to one aspect. The scenario 494 is similar to scenario 472 of FIG. 4D. In particular, an application purchase is illustrated for the web-originated licensing event. In particular, the web portal 414 sends a notification of application purchase to the application download system 412 as depicted at 495. The application download system 412 sends a notification of application download as depicted at 496 to the device shopping client 410. The application download system 412 downloads the application as depicted at 497 to the device shipping client 410. Rather than the device shopping client 410 sending license instantiation to the license agent 402, in this scenario 494 the application download system 412 further initiates license instantiation with the license server 404 as depicted at 498, which in turn the license server 404 synchronizes with the license agent 402 as depicted at 499.

Figure 5:
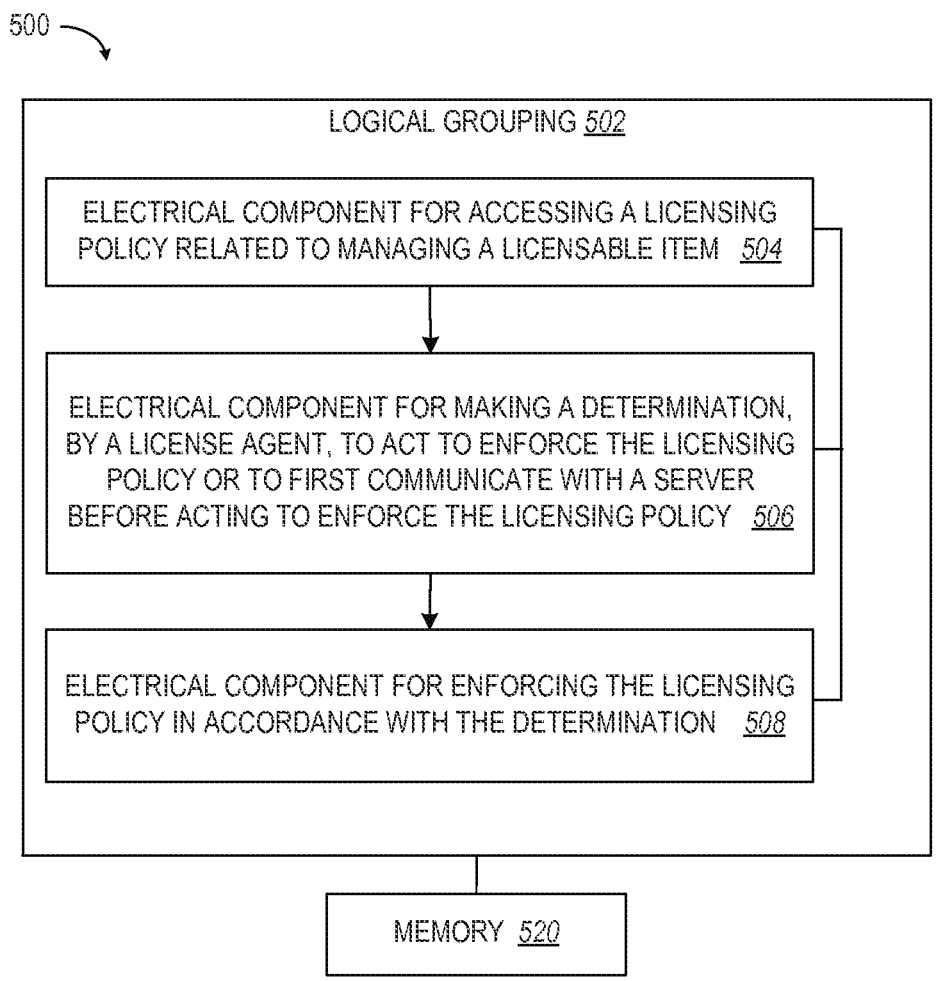
FIG. 5 illustrates a block diagram of a logical grouping of electrical components that resides at least in part in a user device for managing one or more licensed items, according to one aspect.

With reference to FIG. 5, illustrated is a system 500 for managing a licensable item, according to one aspect. For example, system 500 can reside at least partially within user equipment (UE). It is to be appreciated that system 500 is represented as including functional blocks, which can be functional blocks that represent functions implemented by a computing platform, processor, software, or combination thereof (e.g., firmware). System 500 includes a logical grouping 502 of electrical components that can act in conjunction. For instance, logical grouping 502 can include an electrical component 504 for accessing a licensing policy related to managing a licensable item. Moreover, logical grouping 502 can include an electrical component 506 for making a determination, by a license agent, to act to enforce the licensing policy or to first communicate with a server before acting to enforce the licensing policy. Further, logical grouping 502 can include an electrical component 508 for enforcing the licensing policy in accordance with the determination. Additionally, system 500 can include a memory 520 that retains instructions for executing functions associated with electrical components 504-508. While shown as being external to memory 520, it is to be understood that one or more of electrical components 504-508 can exist within memory 520.

Figure 6:
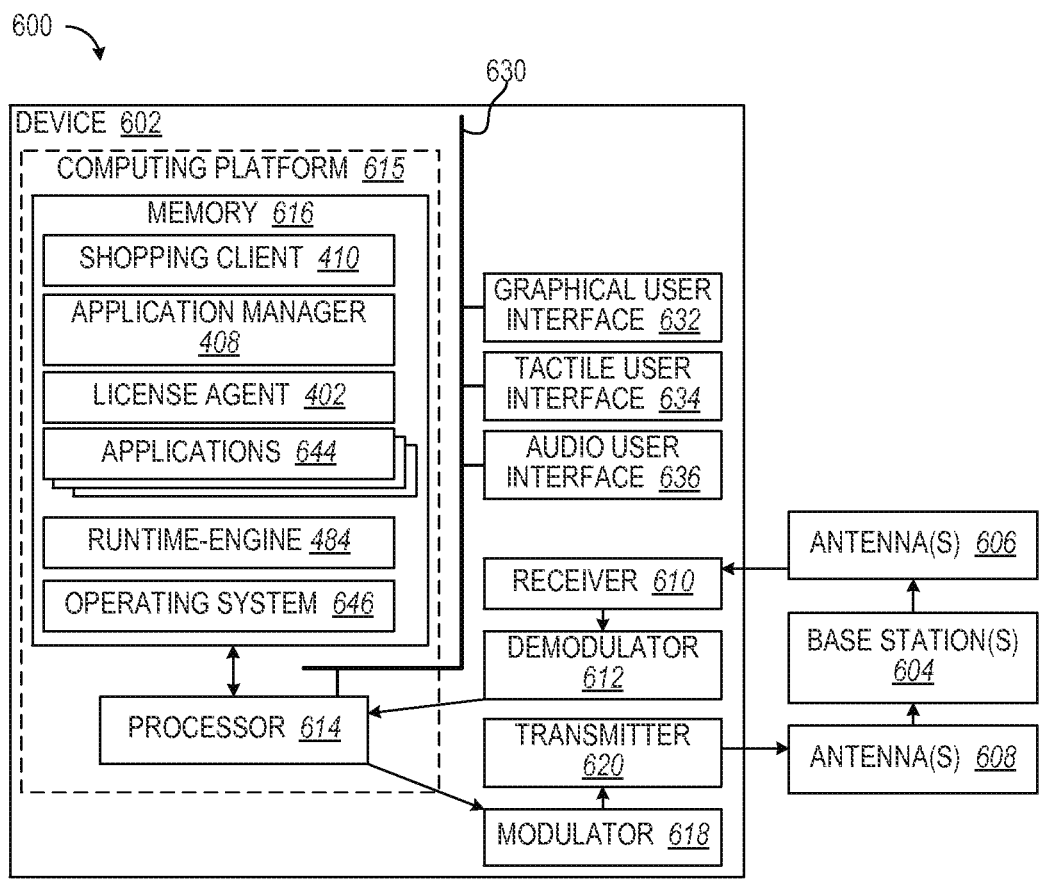
FIG. 6 illustrates a schematic diagram of an exemplary hardware environment of a user device or mobile device for managing one or more licensed items, according to one aspect.

FIG. 6 is a block diagram of another system 600 that can be utilized to implement various aspects of the functionality described herein. In one example, system 600 includes a mobile terminal, user device, communication device, or mobile device 602. As illustrated, mobile device 602 can receive signal(s) from one or more base stations 604 via one or more receive antenna(s) 606 and transmit to the one or more base nodes or base stations 604 via one or more transmit antenna(s) 608. Additionally, mobile device 602 can comprise a receiver 610 that receives information from receive antenna(s) 606. In one example, the receiver 610 can be operatively associated with a demodulator 612 that demodulates received information. Demodulated symbols can then be analyzed by a processor 614. Processor 614 of a computing platform 615 can be coupled to memory 616, which can store information related to code clusters, access terminal assignments, lookup tables related thereto, unique scrambling sequences, and/or other suitable types of information. In one example, mobile device 602 can also include a modulator 618 that can multiplex a signal for transmission by a transmitter 620 through transmit antenna(s) 608.

Databus 630 can interface the processor 614 to a graphical user interface 632, a tactile user interface 634, and an audio user interface 636. In memory 616, a license agent 640 can interact with an application manager 642 that interacts with downloaded applications 644. The license agent 402, device application manager 408, device shopping client 410, runtime engine 484, and downloaded applications 644 can operate upon an operating system 646.

Figure 7:
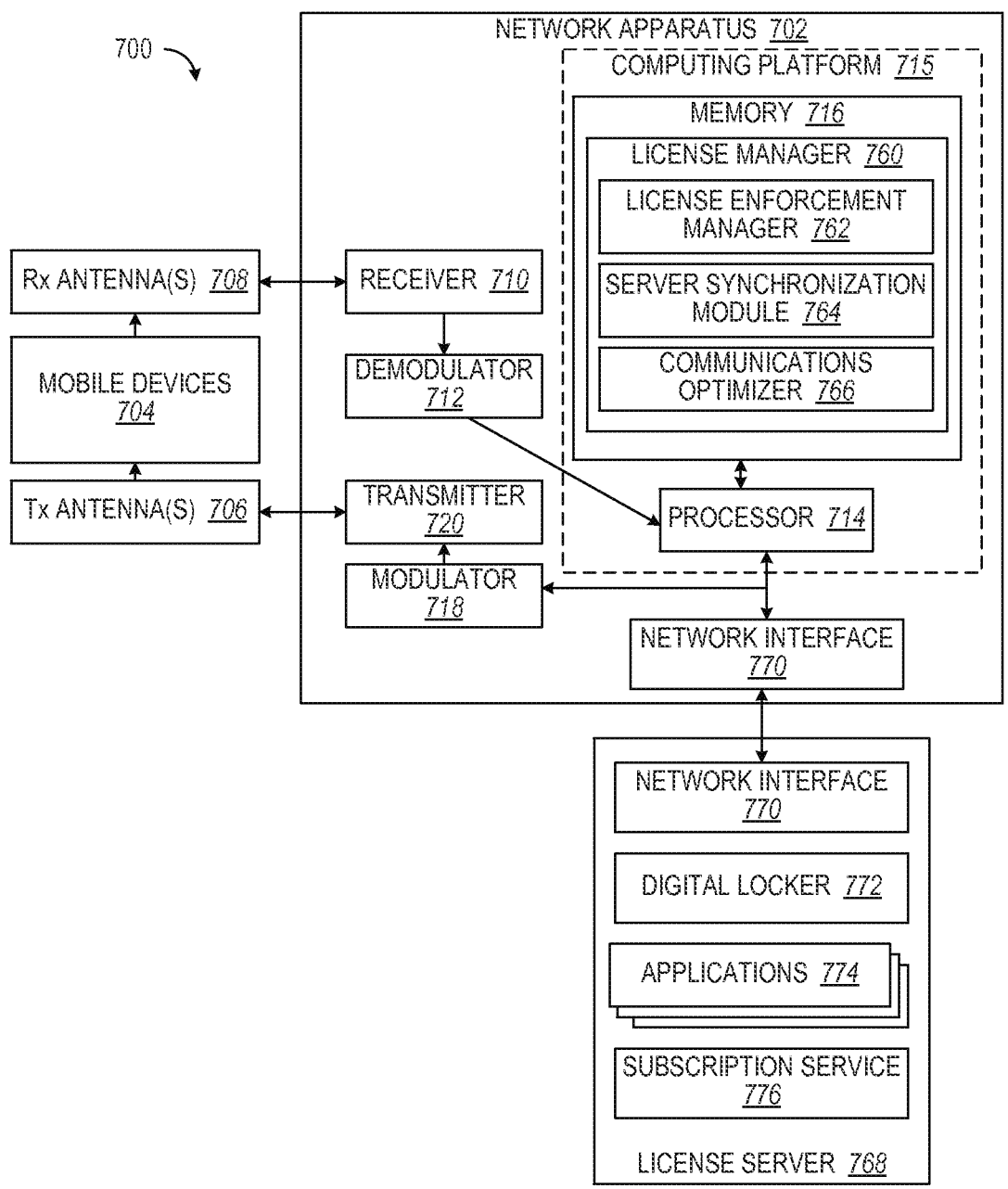
FIG. 7 illustrates a schematic diagram of an exemplary hardware environment of a network apparatus for managing one or more licensed items, according to one aspect.

FIG. 7 is a block diagram of a system 700 that can be utilized to implement various aspects of the functionality described herein. In one example, system 700 includes a network apparatus 702 (e.g., base node or station). As illustrated, network apparatus 702 can receive signal(s) from one or more mobile devices 704 and transmit to the one or more mobile devices 704 via one or more antennas 706.

Additionally, network apparatus 702 can comprise a receiver 710 that receives information from antenna(s) 708. In one example, receiver 710 can be operatively associated with a demodulator 712 that demodulates received information. Demodulated symbols can then be analyzed by a processor 714. Processor 714 of a computing platform 715 can be coupled to memory 716, which can store data and/or program codes related to network apparatus 702. Additionally, network apparatus 702 can employ processor 714 to perform methodologies described herein such as a license manager 760 having components of a license enforcement manager 762, server synchronization module 764, and communications optimizer 766. Network apparatus 702 can also include a modulator 718 that can multiplex a signal for transmission by a transmitter 720 through antenna(s) 706. In an exemplary aspect, some functions for supporting the mobile devices 704 for licensed content is performed remote to the network apparatus 702, depicted as a network server 768 communicating via network interfaces 770 and providing services of a digital locker 772, a repository of applications 774 for download, and subscription services 776.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In addition, the term application as used herein refers to computer software program in general and can further encompass data, configuration settings, etc., used by the computer software program. Examples include utilities such as e-mail, Short Message Service (SMS) text utility, chat interface, web browsers, calculators, viewers, media players, games, etc. In an exemplary aspect, application can refer to software that is suitable for use on a mobile device, especially to being downloaded via a Wireless Local Access Network (WLAN) or Wireless Wide Area Network (WWAN).

As a further example, applications as used herein can also refer to widgets, which can be a code set installed or executed in a webpage without compilation. Examples of widget information which can be downloaded through the Internet include information of weather, traffic, stock, real-time search ranking, photo slide shows, videos, music playlists, post-it notes, horoscopes, and virtual pets, etc. Widgets can be added to social networking profiles, blogs, or Web sites. Examples of types of widgets include (1) a widget engine, (2) GUI widgets (which are a component of a graphical user interface in which the user interacts), (3) Web widgets (which refer to a third party item that can be embedded in a Web page), and (4) mobile widgets (a third party item that can be embedded in a mobile phone).

For clarity, examples herein denote applications that are locally stored on user equipment, mobile devices, handset, access terminals, etc. However, implementations can encompass applications that are remotely stored. Similarly, for clarity distributing of the applications to the mobile devices can be described as being wirelessly downloaded from a WWAN or WLAN or P2P. However, implementations can include wired distribution, manual insertion of non-transitory computer readable storage medium, and unlocking a previously installed software object.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

The invention claimed is:

1. A method of operating an apparatus that is configured to manage a licensable item, comprising:

accessing a licensing policy related to whether an action is permitted to be taken with the licensable item, wherein the licensing policy corresponds to a client version of a license for the licensable item that is maintained on the apparatus and is configured to be synchronized with a server version of the license for the licensable item that is maintained on a server;

making a determination, by a license agent, first attempt to communicate, by the apparatus, with the server in order to synchronize the client and server versions of the license before acting to enforce the licensing policy for the action;

attempting to communicate, by the apparatus, with the server in order to synchronize the client and server versions of the license before acting to enforce the licensing policy for the action in response to the determination to first attempt to communicate with the server in order to synchronize the client and server versions of the license before acting to enforce the licensing policy for the action, wherein synchronization of the client and server versions of the license produces a synchronized client version of the license by updating the client version of the license to include one or more changes made to one or more licensing policies in the server version of the license that occurred after a previous synchronization of the client version of the license with the server version of the license; and enforcing the licensing policy for the action based on the non-synchronized version of the license in response to the attempt to communicate by the apparatus with the server being unsuccessful, wherein accessing the licensing policy includes accessing a first licensing policy related to a first licensable item in a first runtime and accessing a second licensing policy related to a second licensable item in a second runtime, and wherein enforcing the licensing policy includes enforcing the first licensing policy for the first licensable item executed in the first runtime and enforcing the second licensing policy for the second licensable item executed in the second runtime.

2. The method of claim 1, wherein accessing the licensing policy includes accessing an enforcement rule associated with the licensing policy, and wherein enforcing the licensing policy includes determining a constraint imposed by the enforcement rule on the action taken with the licensable item.

3. The method of claim 1, wherein the action is one or more of a recall, deletion, update, transfer, upgrade, expiration, download, and/or activation of the licensable item.

4. The method of claim 1, wherein making the determination further comprises:

accessing a synchronization rule that is associated with the licensing policy; and determining whether the synchronization rule calls for communicating with the server.

5. The method of claim 4, wherein making the determination further comprises:

accessing a time stamp for a most recent synchronization of the licensing policy; and determining whether an elapsed time since the time stamp exceeds the synchronization rule.

6. The method of claim 4, wherein the one or more changes made to the one or more licensing policies includes downloading a new enforcement rule; and wherein enforcing the licensing policy includes determining a constraint imposed by the new enforcement rule on the action taken with the licensable item.

7. The method of claim 1, wherein enforcing the licensing policy includes reporting to the server the action taken with the licensable item.

8. The method of claim 1, wherein attempting to communicate with the server further comprises communicating packet data incorporating data associated with the licensing policy with data traffic that is unrelated to the licensing policy.

9. The method of claim 4, wherein making the determination includes determining that the synchronization rule allows the action to be taken with the licensable item when a connection to the server is unavailable, and wherein the enforcing enables the action to be taken with the licensable item in response to determining that the connection to the server is unavailable.

10. The method of claim 1, wherein the attempt to communicate by the apparatus with the server is determine to be unsuccessful if an associated connection to the server has a capacity less than a threshold value.

11. The method of claim 1, wherein accessing the licensing policy further comprises responding to a user selection of the licensable item.

12. The method of claim 1, wherein making the determination further comprises accessing a synchronization rule that is associated with the licensing policy, and determining whether the synchronization rule calls for communicating with the server, and wherein enforcing the licensing policy further comprises delaying the action for the licensable item until the licensing policy is synchronized with the server in response to the determination to first attempt to communicate with the server in order to synchronize the client and server versions of the license before acting to enforce the licensing policy for the action.

13. The method of claim 1, wherein accessing the licensing policy further comprises pre-fetching the licensing policy prior to a user selection of the licensable item.

14. The method of claim 13, wherein pre-fetching the licensing policy further comprises pre-fetching the licensing policy associated with more than one licensable item.

15. The method of claim 13, wherein pre-fetching the licensing policy further comprises pre-fetching more than one licensing policy associated respectively with more than one licensable item.

16. The method of claim 13, wherein pre-fetching the licensing policy further comprises pre-fetching more than one licensing policy incrementally over intermittent communication sessions with the server.

17. The method of claim 1, wherein accessing the licensing policy includes accessing a first licensing policy related to a first licensable item of a first service type and accessing a second licensing policy related to a second licensable item of a second service type, and wherein enforcing the licensing policy includes enforcing the first licensing policy for the first licensable item and enforcing the second licensing policy for the second licensable item.

18. The method of claim 1, wherein enforcing the licensing policy further comprises monitoring duration of use or an enumeration of launches of the licensable item.

19. An apparatus for managing a licensable item, comprising:

at least one processing circuit configured to:

access a licensing policy related to whether an action is permitted to be taken with the licensable item, wherein the licensing policy corresponds to a client version of a license for the licensable item that is maintained on the apparatus and is configured to be synchronized with a server version of the license for the licensable item that is maintained on a server;

make a determination to first attempt to communicate with the server in order to synchronize the client and server versions of the license before acting to enforce the licensing policy for the action;

attempt to communicate with the server in order to synchronize the client and server versions of the license before acting to enforce the licensing policy for the action in response to the determination to first attempt to communicate with the server in order to synchronize the client and server versions of the license before acting to enforce the licensing policy for the action, wherein synchronization of the client and server versions of the license produces a synchronized client version of the license by updating the client version of the license to include one or more changes made to one or more licensing policies in the server version of the license that occurred after a previous synchronization of the client version of the license with the server version of the license; and enforce the licensing policy for the action based on the non-synchronized version of the license in response to the attempt to communicate by the apparatus with the server being unsuccessful, wherein the at least one processing circuit is configured to access the licensing policy by accessing a first licensing policy related to a first licensable item in a first runtime and accessing a second licensing policy related to a second licensable item in a second runtime, and wherein the at least one processing circuit is configured to enforce the licensing policy by enforcing the first licensing policy for the first licensable item executed in the first runtime and enforcing of the second licensing policy for the second licensable item executed in the second runtime.

20. A non-transitory computer-readable storage medium for storing instructions that, when executed by a computer, cause the computer to manage a licensable item, the instructions comprising:

at least one instruction for causing the computer to access a licensing policy related to whether an action is permitted to be taken with the licensable item, wherein the licensing policy corresponds to a client version of a license for the licensable item that is maintained on the computer and is configured to be synchronized with a server version of the license for the licensable item that is maintained on a server;

at least one instruction for causing the computer to make a determination, by a license agent, to first attempt to communicate, by the computer, with the server in order to synchronize the client and server versions of the license before acting to enforce the licensing policy for the action;

at least one instruction for causing the computer to attempt to communicate with the server in order to synchronize the client and server versions of the license before acting to enforce the licensing policy for the action in response to the determination to first attempt to communicate with the server in order to synchronize the client and server versions of the license before acting to enforce the licensing policy for the action, wherein synchronization of the client and server versions of the license produces a synchronized client version of the license by updating the client version of the license to include one or more changes made to one or more licensing policies in the server version of the license that occurred after a previous synchronization of the client version of the license with the server version of the license; and at least one instruction for causing the computer to enforce the licensing policy for the action based on the non-synchronized version of the license in response to the attempt to communicate by the computer with the server being unsuccessful, wherein the at least one instruction for causing the computer to access causes the computer to access the licensing policy by accessing a first licensing policy related to a first licensable item in a first runtime and accessing a second licensing policy related to a second licensable item in a second runtime, and wherein the at least one instruction for causing the computer to enforce causes the computer to enforce the licensing policy by enforcing the first licensing policy for the first licensable item executed in the first runtime and enforcing of the second licensing policy for the second licensable item executed in the second runtime.

21. An apparatus for managing a licensable item, comprising:

means for accessing a licensing policy related to whether an action is permitted to be taken with the licensable item, wherein the licensing policy corresponds to a client version of a license for the licensable item that is maintained on the apparatus and is configured to be synchronized with a server version of the license for the licensable item that is maintained on a server;

means for making a determination, by a license agent, to first attempt to communicate, by the apparatus, with the server in order to synchronize the client and server versions of the license before acting to enforce the licensing policy for the action;

means for attempting to communicate with the server in order to synchronize the client and server versions of the license before acting to enforce the licensing policy for the action in response to the determination to first attempt to communicate with the server in order to synchronize the client and server versions of the license before acting to enforce the licensing policy for the action, wherein synchronization of the client and server versions of the license produces a synchronized client version of the license by updating the client version of the license to include one or more changes made to one or more licensing policies in the server version of the license that occurred after a previous synchronization of the client version of the license with the server version of the license; and means for enforcing the licensing policy for the action based on the non-synchronized version of the license in response to the attempt to communicate by the apparatus with the server being unsuccessful, wherein the means for accessing accesses the licensing policy by accessing a first licensing policy related to a first licensable item in a first runtime and accessing a second licensing policy related to a second licensable item in a second runtime, and wherein the means for enforcing enforces the licensing policy by enforcing the first licensing policy for the first licensable item executed in the first runtime and enforcing of the second licensing policy for the second licensable item executed in the second runtime.

22. An apparatus for managing a licensable item, comprising:
a network interface circuit configured to communicate with a server; and
a processor configured to execute a license agent for accessing a licensing policy related to whether an action is permitted to be taken with the licensable item, wherein the licensing policy corresponds to a client version of a license for the licensable item that is maintained on the apparatus and is configured to be synchronized with a server version of the license for the licensable item that is maintained on the server, making a determination, by the license agent, to first attempt to communicate, by the apparatus, with the server in order to synchronize the client and server versions of the license before acting to enforce the licensing policy for the action; attempting to communicate with the server via the network interface circuit in order to synchronize the client and server versions of the license before acting to enforce the licensing policy for the action in response to the determination to first attempt to communicate with the server in order to synchronize the client and server versions of the license before acting to enforce the licensing policy for the action, wherein synchronization of the client and server versions of the license produces a synchronized client version of the license by updating the client version of the license to include one or more changes made to one or more licensing policies in the server version of the license that occurred after a previous synchronization of the client version of the license with the server version of the license, and to enforce the licensing policy for the action based on the non-synchronized version of the license in response to the attempt to communicate by the apparatus with the server being unsuccessful,
wherein the license agent is configured to access the licensing policy by accessing a first licensing policy related to a first licensable item in a first runtime and accessing a second licensing policy related to a second licensable item in a second runtime, and
wherein the license agent is configured to enforce the licensing policy by enforcing the first licensing policy for the first licensable item executed in the first runtime and enforcing of the second licensing policy for the second licensable item executed in the second runtime.

23. The apparatus of claim 22, wherein the license agent is configured to access the licensing policy by accessing an enforcement rule associated with the licensing policy, and the license agent is configured to enforce the licensing policy by determining a constraint imposed by the enforcement rule on the action taken with the licensable item.

24. The apparatus of claim 22, wherein the action is one or more of recall, deletion, update, transfer, upgrade, expiration, download and/or activation of the licensable item.

25. The apparatus of claim 22, wherein the license agent is configured to make the determination by accessing a synchronization rule that is associated with the licensing policy, and determining whether the synchronization rule calls for communicating with the server.

26. The apparatus of claim 25, wherein the license agent is configured to make the determination by accessing a time stamp for a most recent synchronization of the licensing policy, and determining whether an elapsed time since the time stamp exceeds the synchronization rule.

27. The apparatus of claim 25, wherein the license agent is configured to download a new enforcement rule, and determines a constraint imposed by the new enforcement rule on the action taken with the licensable item.

28. The apparatus of claim 22, wherein the license agent is configured to enforce the licensing policy by reporting to the server the action taken with the licensable item.

29. The apparatus of claim 22, wherein the network interface circuit is configured to attempt to communicate with the server by communicating packet data incorporating data associated with the licensing policy with data traffic that is unrelated to the licensing policy.

30. The apparatus of claim 25, wherein the license agent is configured to determine that the synchronization rule allows the action to be taken with the licensable item when a connection to the server is unavailable, and is configured to enable the action to be taken with the licensable item in response to determining that the connection to the server is unavailable.

31. The apparatus of claim 22, wherein the license agent is configured to determine that the attempt to communicate by the apparatus with the server is unsuccessful if an associated connection to the server has a capacity less than a threshold value.

32. The apparatus of claim 22, wherein the license agent is configured to access the licensing policy in response to a user selection of the licensable item.

33. The apparatus of claim 22, wherein the license agent is configured to attempt to communicate with the server by accessing a synchronization rule that is associated with the licensing policy, and determining whether the synchronization rule calls for communicating with the server, and
wherein the license agent is configured to enforce the licensing policy by delaying the action for the licensable item until the licensing policy is synchronized with the server.

34. The apparatus of claim 22, wherein the license agent is configured to access the licensing policy by pre-fetching the licensing policy prior to a user selection of the licensable item.

35. The apparatus of claim 34, wherein the pre-fetched licensing policy is associated with more than one licensable item.

36. The apparatus of claim 34, wherein the license agent is configured to pre-fetch the licensing policy by pre-fetching more than one licensing policy associated collectively with more than one licensable item.

37. The apparatus of claim 34, wherein the license agent is configured to pre-fetch the licensing policy by pre-fetching more than one licensing policy incrementally over intermittent communication sessions with the server.

38. The apparatus of claim 22, wherein the license agent is configured to access the licensing policy by accessing a first licensing policy related to a first licensable item of a first service type and accessing a second licensing policy related to a second licensable item of a second service type, and
wherein the license agent is configured to enforce the licensing policy by enforcing the first licensing policy for the first licensable item and enforcing the second licensing policy for the second licensable item.

39. The apparatus of claim 22, wherein the license agent is configured to enforce the licensing policy by monitoring duration of use or an enumeration of launches of the licensable item.

40. The method of claim 1, wherein the licensing policy for the action is configured to be enforced based on the synchronized client version of the license in response to a successful attempt to communicate by the apparatus with the server.

\* \* \* \* \*